US011449522B2

(12) United States Patent
Chattopadhyay et al.

(10) Patent No.: US 11,449,522 B2
(45) Date of Patent: Sep. 20, 2022

(54) SYSTEMS AND METHODS FOR RECOMMENDING EXECUTION ENVIRONMENT FOR ANALYSING SENSOR OBSERVATIONAL DATA

(71) Applicant: Tata Consultancy Services Limited, Mumbai (IN)

(72) Inventors: Tanushyam Chattopadhyay, Kolkata (IN); Arindam Halder, Kolkata (IN); Sangram Dasharath Gaikwad, Kolkata (IN); Tania Ghosh, Kolkata (IN); Abhisek Das, Kolkata (IN); Shubhrangshu Ghosh, Kolkata (IN); Suvra Dutta, Kolkata (IN); Prateep Misra, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/359,818

(22) Filed: Jun. 28, 2021

(65) Prior Publication Data
US 2022/0269689 A1    Aug. 25, 2022

(30) Foreign Application Priority Data
Jan. 20, 2021  (IN) .............................. 202121002804

(51) Int. Cl.
*G06F 17/00* (2019.01)
*G06F 16/25* (2019.01)
*G06F 16/2455* (2019.01)

(52) U.S. Cl.
CPC ........ *G06F 16/254* (2019.01); *G06F 16/2455* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS 11,099,925 B2 *  8/2021  Wolfson .............. G06F 11/0793
11,157,906 B1 * 10/2021  Smith .................. G06Q 20/405
(Continued)

OTHER PUBLICATIONS

Liu et al., "Software-Defined Edge Cloud Framework for Resilient Multitenant Applications," Wireless Communications and Mobile Computing, 2019:3947286, 17 pages (2019).

*Primary Examiner* — Hung D Le
(74) *Attorney, Agent, or Firm* — Finnegan, Henderson, Farabow, Garrett & Dunner LLP

(57) ABSTRACT

Sensor data (or IoT) analytics plays a critical role in taking business decisions for various entities (e.g., organizations, project owners, and the like). However, scaling of such analytical solutions beyond certain point requires adopting to various computing environments which seems to be challenging with the constrained resources available. Embodiments of the present disclosure provide system and method for analysing and executing sensor observational data in computing environments, wherein extract, transform, load (ETL) workflow pipeline created by users in the cloud, can be seamlessly deployed to job execution service available in cloud/edge without any changes in the code/config by end user. The configuration changes are internally handled by the system based on the selected computing environment and queries are executed either in distributed or non-distributed environments to output data frames. The data frames are further pre-processed in a desired computing environment and thereafter visualized accordingly.

15 Claims, 4 Drawing Sheets

(56) References Cited

U.S. PATENT DOCUMENTS

| | | |
|---|---|---|
| 2019/0324745 A1 | 10/2019 | Chandra et al. |
| 2021/0000491 A1* | 1/2021 | Chappuis ............... A61B 34/30 |
| 2021/0056770 A1* | 2/2021 | Moradi Pari ........ H04B 7/0626 |
| 2021/0209310 A1* | 7/2021 | Hewitt .................... G06F 40/35 |
| 2021/0360070 A1* | 11/2021 | Cella ..................... H04W 40/02 |
| 2022/0043938 A1* | 2/2022 | Kochura ................. G06F 21/83 |
| 2022/0058177 A1* | 2/2022 | Bhatia ................... G06F 16/285 |
| 2022/0075369 A1* | 3/2022 | Simsek-Ege ......... G07C 5/0808 |
| 2022/0157147 A1* | 5/2022 | Hasan .................. G08B 26/008 |

* cited by examiner

SYSTEMS AND METHODS FOR RECOMMENDING EXECUTION ENVIRONMENT FOR ANALYSING SENSOR OBSERVATIONAL DATA

PRIORITY CLAIM

This U.S. patent application claims priority under 35 U.S.C. § 119 to: India Application No. 202121002804, filed on Jan. 20, 2021. The entire contents of the aforementioned application are incorporated herein by reference.

TECHNICAL FIELD

The disclosure herein generally relates to data analytics, and, more particularly, to systems and methods for analysing and executing sensor observational data in computing environments.

BACKGROUND

Big data or sensor data analytics plays a critical role in taking business decisions for various entities (e.g., organizations, project owners, and the like). However, scaling of such analytical solutions beyond certain point requires adopting to various computing environments, such as distributed and non-distributed computing environments. Given computing system constraints, it is challenging to visualize such efforts in various computing environments. While attempts have been made to analyze and execute sensor data in such environments there is a tradeoff between computational resources, operating environment, cost, and human resources. For instance, existing solutions utilize one of the environments but face challenges in creating a framework for data conversion, pre-processing of data, execution of user queries, etc. Therefore, such existing solutions are not feasible and inefficient for deployment across environments and computing resources. Additional limitations of existing approaches include such as they are restricted to single computing environment type, and the time and execution query performance are not optimal in the existing framework. Further, existing solutions require prior information with respect to environment functionalities and principles for executing codes in numerous environments which leads to lots of changes in code base and increase in the development time. Moreover, existing solutions have the issues regarding over-provisioning and under-provisioning of the resources and infrastructure. These are some of the challenges that need to be addressed.

SUMMARY

Embodiments of the present disclosure present technological improvements as solutions to one or more of the above-mentioned technical problems recognized by the inventors in conventional systems. For example, in one aspect, there is provided a processor implemented method for analysing and executing sensor observational data in computing environments. The method comprises receiving, an input comprising one or more parameters specific to an industrial internet of things (IIoT) use case; selecting, via one or more hardware processors, a first processing environment based on the one or more parameters; generating, via the one or more hardware processors, metadata based on the first processing environment, wherein the metadata is generated based a location information corresponding to an observational data comprised in a database, wherein the observational data is specific to one or more sensors deployed in an IoT network; populating the observational data in the first processing environment based on (i) a storage system, (ii) the metadata and (iii) number of available resources in the first processing environment; receiving, one or more input queries from one or more users; executing, the one or more input queries on the observational data, in one of the first processing environment or a second processing environment to obtain a data frame; and pre-processing the obtained data frame in one of the first processing environment or the second processing environment and plotting the pre-processed data frame in the second processing environment.

In an embodiment, the one or more parameters comprise at least one of one or more resources, sensor data, an input query, an enterprise storage system, and a file format.

In an embodiment, the first processing environment is a distributed computing environment, and the second processing environment is a non-distributed computing environment.

In an embodiment, the metadata comprises at least one of a file format, a file size, number of observations in the observational data, datatype of one or more observed properties in the observational data, and frequency of the observational data.

In an embodiment, the step executing, the one or more input queries on the observational data, in one of the first processing environment or a second processing environment to obtain a data frame comprises determining whether the one or more input queries are executable in the first processing environment or the second processing environment and switching from the first processing environment to the second processing environment for execution of the one or more input queries respectively.

In another aspect, there is provided a system for analysing and executing sensor observational data in computing environments. The system comprises a memory storing instructions; one or more communication interfaces; and one or more hardware processors coupled to the memory via the one or more communication interfaces, wherein the one or more hardware processors are configured by the instructions to: receive, via one or more hardware processors, an input comprising one or more parameters specific to an industrial internet of things (IIoT) use case; select, via the one or more hardware processors, a first processing environment based on the one or more parameters; generate, via the one or more hardware processors, metadata based on the first processing environment, wherein the metadata is generated based a location information corresponding to an observational data comprised in a database, and wherein the observational data is specific to one or more sensors deployed in an IoT network; populate the observational data in the first processing environment based on (i) a storage system, (ii) the metadata and (iii) number of available resources in the first processing environment; receive, one or more input queries from one or more users; execute, the one or more input queries on the observational data, in one of the first processing environment or a second processing environment to obtain a data frame; and pre-process the obtained data frame in one of the first processing environment or the second processing environment and plotting the pre-processed data frame in the second processing environment.

In an embodiment, the one or more parameters comprise at least one of one or more resources, sensor data, an input query, an enterprise storage system, and a file format.

In an embodiment, the first processing environment is a distributed computing environment, and the second processing environment is a non-distributed computing environment.

In an embodiment, the metadata comprises at least one of a file format, a file size, number of observations in the observational data, datatype of one or more observed properties in the observational data, and frequency of the observational data.

In an embodiment, the step of executing, the one or more input queries on the observational data, in one of the first processing environment or a second processing environment to obtain a data frame comprises determining whether the one or more input queries are executable in the first processing environment or the second processing environment and switching from the first processing environment to the second processing environment for execution of the one or more input queries respectively.

In yet another aspect, there is provided a computer program product comprising a non-transitory computer readable medium having a computer readable program embodied therein, wherein the computer readable program, when executed on a computing device causes the computing device to analyse and execute sensor observational data in computing environments by receiving, via one or more hardware processors, an input comprising one or more parameters specific to an industrial internet of things (IIoT) use case; selecting, via the one or more hardware processors, a first processing environment based on the one or more parameters; generating, via the one or more hardware processors, metadata based on the first processing environment, wherein the metadata is generated based a location information corresponding to an observational data comprised in a database, and wherein the observational data is specific to one or more sensors deployed in an IoT network; populating, via the one or more hardware processors, the observational data in the first processing environment based on (i) a storage system, (ii) the metadata and (iii) number of available resources in the first processing environment; receiving, via the one or more hardware processors, one or more input queries from one or more users; executing, via the one or more hardware processors, the one or more input queries on the observational data, in one of the first processing environment or a second processing environment to obtain a data frame; and pre-processing, via the one or more hardware processors, the obtained data frame in one of the first processing environment or the second processing environment and plotting the pre-processed data frame in the second processing environment.

In an embodiment, the one or more parameters comprise at least one of one or more resources, sensor data, an input query, an enterprise storage system, and a file format.

In an embodiment, the first processing environment is a distributed computing environment, and the second processing environment is a non-distributed computing environment.

In an embodiment, the metadata comprises at least one of a file format, a file size, number of observations in the observational data, datatype of one or more observed properties in the observational data, and frequency of the observational data.

In an embodiment, the step executing, the one or more input queries on the observational data, in one of the first processing environment or a second processing environment to obtain a data frame comprises determining whether the one or more input queries are executable in the first processing environment or the second processing environment and switching from the first processing environment to the second processing environment for execution of the one or more input queries respectively.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
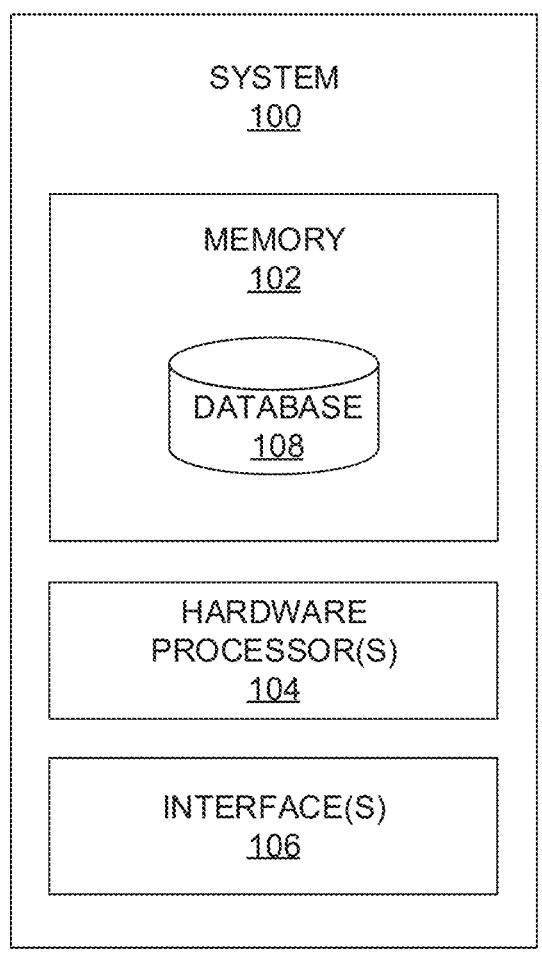
FIG. 1 depicts a system for analysing and executing sensor observational data in computing environments, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 depicts a system 100 for analysing and executing sensor observational data in computing environments, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises details on input received, processing/computing environment being selected, metadata, observational data obtained through one or more sensors connected in an Internet of Things (IoT) network (e.g., alternatively, the sensors may be connected to a IoT device wherein the sensors are either integral part of the IoT device or externally connected to the IoT device), location information of the observational data, queries being executed, data frame associated with the observational data, pre-processed data frames pertaining to IIoT use case, and one or more various plots.

The information stored in the database 108 further comprises details on various resources, data query, enterprise storage system(s), file formats, other queries (e.g., cost-optimized, time-optimized, resource-optimized, and the like. The database 108 further comprises details of resources available such as Spark, Hadoop Distributed File System (HDFS), graphics processing units (GPU), container memory, container volume, and the like. The memory 102 may store various as known in the art techniques which are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
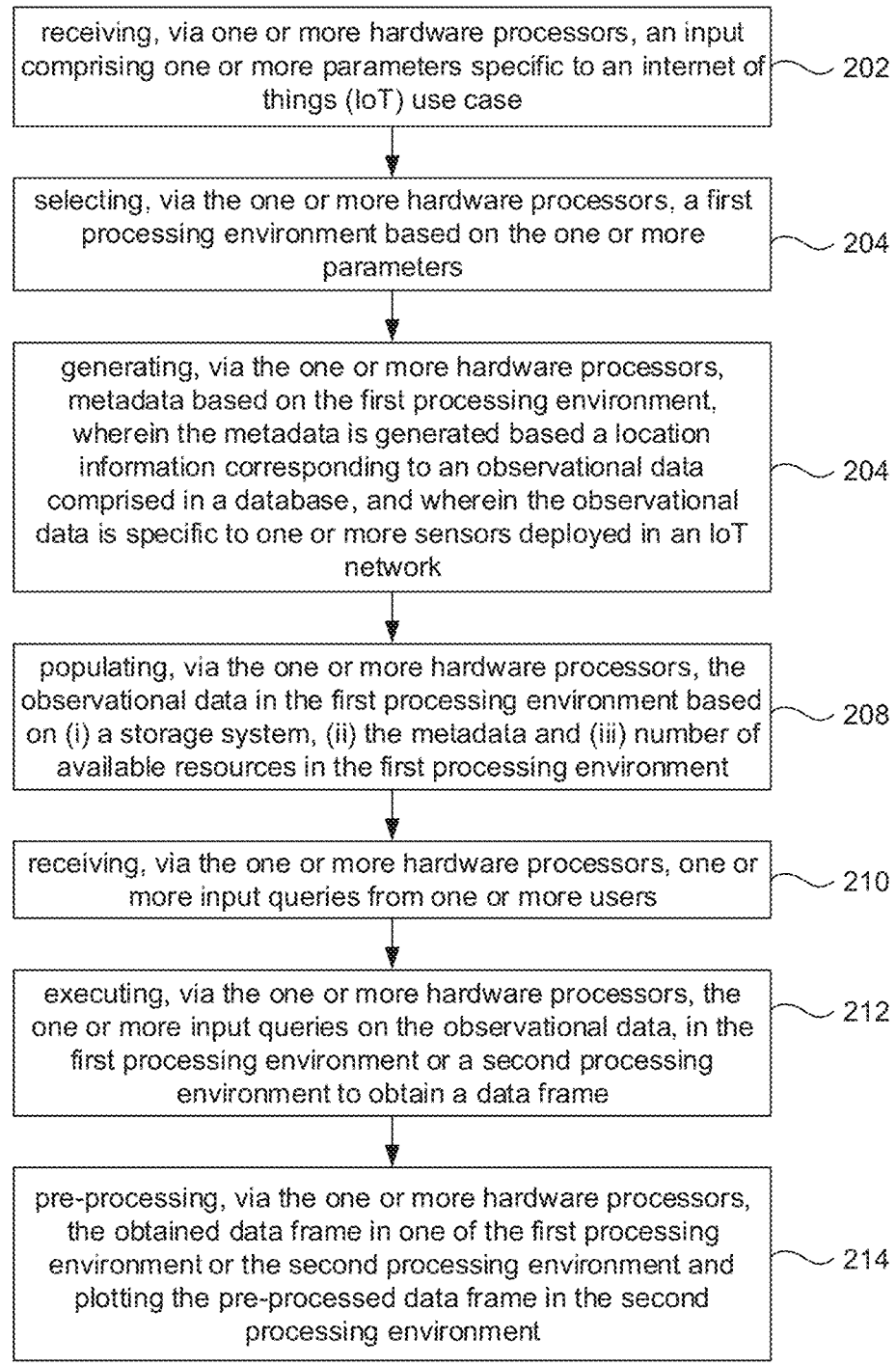
FIG. 2 depicts an exemplary flow chart illustrating a method for analysing and executing sensor observational data in computing environments, using the system of FIG. 1, in accordance with an embodiment of the present disclosure.

FIG. 2, with reference to FIG. 1, depicts an exemplary flow chart illustrating a method for analysing and executing sensor observational data in computing environments, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 receive an input comprising one or more parameters specific to an industrial internet of things (IIoT) use case. For instance, the input to the system 100 may include a query from one or more users to determine availability of various components for execution in an environment. For instance, based on the input received, the system 100 retrieves amount/types of resources available (e.g., Spark, Hadoop Distributed File System (HDFS), graphics processing units (GPU), container memory, container volume). Other inputs received by the system 100 may include a query such as 'provide details of various environments'. In other words, the one or more parameters comprise at least one of one or more available resources, the observational data, an input data query, an enterprise storage system type, and a file format. Examples of IIoT use case include but are not limited to healthcare use case scenario, manufacturing use case scenario, and the like. It is to be understood by a person having ordinary skill in the art or person skilled in the art that examples of IIoT use cases described herein shall not construed as limiting the scope of the present disclosure.

Based on the input received, the system 100 outputs various details. For instance, if only container is available, only containerized resources are fetched through container orchestration i.e., Kubernetes, docker, and the like. If spark is available, the resources are fetched using spark configuration. For HDFS, the resources are fetched using HDFS configuration files mounted during deployment. If GPU is available, the resources are fetched using NVIDIA® application programming interfaces (APIs). Below Table 1 depicts the details provided based on the input received by the system.

TABLE 1

| Resource | Availability | Configuration |
| --- | --- | --- |
| Spark | Available | 3 node cluster 4 core each having 8 GB Memory |
| HDFS | Available | Shared servers with Spark |
| GPU | Not available | Not available |
| Container (Non-distributed processing environment) | Available | 2 Core 4 GB Memory |

More specifically, based on the input parameters, the processing environments are recommended by the system 100 to analyse observational data. The processing environments are depicted in Table 1 above. Referring to steps of FIG. 2, once the input is received which includes various parameters as mentioned above, at step 204 of the present disclosure, the one or more hardware processors 104 select a first processing environment based on the one or more parameters. In one embodiment, the first processing environment is selected based on the one or more parameters and/or the recommended environments. Such selection of the processing environment may be based on one or more user inputs, in one example embodiment. For instance, the recommended environments may be displayed to user for his/her selection. Alternatively, the system 100 intelligently selects a processing environment (e.g., a distributed computing environment or a non-distributed computing environment) based on the input query (or the one or more parameters). In such scenarios where the system 100 recommends and selects the processing environment on its own, there may not be any inputs from user(s). At step 206 of the present disclosure, the one or more hardware processors 104 generate metadata based on the selected first processing environment. The metadata is generated based a location information corresponding to an observational data, in one embodiment of the present disclosure. The location information is obtained from the one or more users. For instance, a user may specify a file path, a database location, a sensor name associated with the observational data, an enterprise storage system path, and the like. The location information is a uniform resource locator (URL) corresponding to one or more of file(s), a folder, a database, a sensor name, an enterprise storage system, and the like, in one example embodiment. The metadata comprises at least one of a file format, a file size, number of observations in the observational data, datatype of one or more observed properties in the observational data, and frequency of the observational data. In other words, the metadata includes file format, file size, number of observations (or sensor samples/values) obtained in the observational data, datatype of observed properties/samples in the observational data, and frequency of the observational data (e.g., at what time intervals is the observational data from various sensor(s) is flowing into the system 100). It is to be understood by a person having ordinary skill in the art or person skilled in the art that there could be variations of metadata being generated by the system 100 and such examples of metadata being generated and described herein shall not be construed as limiting the scope of the present disclosure. Below Table 2 depicts exemplary metadata being generated by the system based on the location information of the observational data and the selected first processing environment.

TABLE 2

| Format | Size | No of samples | Environment | Environment configuration | Data type | Type of data |
| --- | --- | --- | --- | --- | --- | --- |
| parquet | 10.78 GB | 1,238,600 | [spark, HDFS, container] | 3 node cluster 4 core each having 8 GB Memory | [int, str, ... float] | Time-series |
| csv | 92.7 MB | 610,000 | [container] | NA | [int, str, ... float] | Time-series |
| parquet | 29.86 GB | 600,000 | [spark, Azure BLOB, container] | 5 node cluster 8 core each having 16 GB Memory | [int, str, ... float] | Non time-series |

At step 208 of the present disclosure, the one or more hardware processors 104 populate the observational data in the selected first processing environment based on (i) an enterprise storage system (also referred as storage system and interchangeably used herein), (ii) the metadata and (iii) number of available resources in the selected first processing environment. In other words, depending on the storage system, metadata and resources, observational data is populated in first processing environment. For example, if the metadata is {format: parquet, size: 5 GB, no of samples: 20100065, environment: [spark, Azure BLOB, container], datatype: [int, str, . . . float]}, then, the size of the observational data, type of the environment are checked for environment creation. Below Table 3 depicts an exemplary observational data being populated in the selected environment.

TABLE 3

| Environment | Location |
| --- | --- |
| Distributed via Spark data frame | Notebook_DF/v1/nbuser1/parquet/1588175325/SampleData1.parquet |
| Non-distributed via Pandas data frame | SampleData2.csv |
| Distributed via Spark data frame | Notebook_DF/v1/nbuser1/parquet/1452172/SampleData3.parquet |

At step 210 of the present disclosure, the one or more hardware processors 104 receive one or more input queries from one or more users and at step 212 of the present disclosure, the one or more hardware processors 104 execute the one or more input queries on the observational data, in the first processing environment or a second processing environment to obtain a data frame. In an embodiment of the present disclosure, the first processing environment is a distributed computing environment, and the second processing environment is a non-distributed computing environment. The expressions 'processing environment', 'computing environment' and 'execution environment' may be interchangeably used herein. A distributed system/distributed computing environment/distributed processing environment, also known as distributed computing, is a system with multiple components located on different machines (or on separate locations) that communicate and coordinate actions in order to appear as a single coherent system to the end-user. Examples of distributed computing include HDFS, client-server architectures wherein some of the data processing are carried on client device and some of the processing on server. A non-distributed system/non-distributed computing environment/non-distributed processing environment, also known as non-distributed computing, is an environment where components located on a single machine wherein all the processing of queries, data and the like happens in a single machine (or all the parts of the system are in the same physical location). Example of non-distributed computing environments include but are not limited to Pandas data framework. Another example of non-distributed environment wherein components such as applications of Microsoft® such as Microsoft Office, and Operating system are co-located wherein data processing may be locally performed. While executing the one or more queries, the system 100/the one or more hardware processors 104 determine whether the one or more input queries are executable in the first processing environment or the second processing environment. For instance, there could be few queries that are executable in the first processing environment and there could be other queries that are executable in the second processing environment. Based on this determination, the system 100 switches from one processing environment to another processing environment to ensure that the one or more queries received from the users are executed and accordingly output are generated and provided back to users. In other words, based on the queries, the processing environments are recommended by the system 100 to analyse observational data and execute the queries on the observational data. During the query execution, the system 100 may automatically take decisions on which query can be executed in which environment depending upon historical data/training data, in one example embodiment. In other words, if the system 100 has selected a specific computing environment wherein historical queries from user(s) are either identical or similar in comparison to current queries obtained from one or more user, then such scenarios the system 100 may automatically select the same computing environment and execute the current queries. The historic/training data may be used to train the system 100 and such training can be over specific time interval (e.g., once in a week, once in a month, once in x-months, say x=3, and the like). The historic/training data is comprised in the database 108 or the memory 102 and is periodically updated, in one embodiment. Alternatively, if there is match found between the current queries from the user and the historic queries, the system 100 may display or recommend the user that specific computing environment and further display a message that such recommendation has been made since historically there was an identical or similar query for execution on similar observational data (or near similar observational data). Such recommendation includes (or may include) automatically recommending and (automatically or semi-automatically) selecting (i) the same computing environment which is already selected wherein the observational data is populated in the same computing environment or (ii) a different computing environment since the queries from user(s) are not executable in the current selected computing/processing environment. The expression 'semi-automatically' refers to recommendation and/or selection of environment with the help of user input(s), in one example embodiment. Post selection of the computing environment, if different from the current computing environment, the system 100 switches from the current computing environment to another computing environment (e.g., from a distributed computing environment to a non-distributed computing environment or vice versa).

Based on the query (e.g., domain, user defined functions, customized query), type of data frame and resources the transformation is executed (e.g., select last 'n' rows, join, aggregate, filter, etc.). In other words, consider a query wherein the query is to select last 'n' rows from the data frame. This tail function can be executed faster and efficiently in a non-distributed processing/computing environment if it is available based on the above metadata. If available, internal conversion of distributed to non-distributed is made, and the query is processed. Returns the resultant data frame as distributed data frame. Below Table 4 depicts an exemplary dataset on which the input query received from a user is executed.

TABLE 4

(Dataset)

| f1 | f2 | f3 | ... | p63 | p64 | rpm | vel | uts |
|---|---|---|---|---|---|---|---|---|
| 3834.83 | 3764.52 | 4148.68 | ... | 2.57 | 2.87 | 603.478 | 196.85 | 156.36 |
| 3498.86 | 3593.96 | 3741.37 | ... | 2.56 | 2.63 | 2566.71 | 57.33 | 196.39 |
| 5661.83 | 5629.48 | 5811.72 | ... | 2.36 | 2.24 | 1855.85 | 104.74 | 208.34 |
| 4647.81 | 4588.47 | 4489.49 | ... | 2.47 | 2.48 | 1764.25 | 50.96 | 195.14 |
| 6011.87 | 674.36 | 1188.03 | ... | 2.37 | 2.36 | 987.19 | 113.85 | 249.42 |
| ... | ... | ... | ... | ... | ... | ... | ... | ... |
| 5108.65 | 5008.65 | 5135.26 | ... | 2.45 | 2.47 | 2547.12 | 84.94 | 210.63 |
| 5145.82 | 5155.48 | 5153.69 | ... | 2.49 | 2.43 | 987.73 | 40.78 | 225.79 |
| 5924.17 | 5819.59 | 5846.90 | ... | 2.42 | 2.40 | 599.70 | 38.47 | 210.19 |
| 7840.39 | 7940.39 | 7853.85 | ... | 2.44 | 2.43 | 999.73 | 164.84 | 244.82 |
| 3817.70 | 3898.52 | 3862.67 | ... | 2.49 | 2.49 | 1489.54 | 37.75 | 191.03 |

In the above table, f1, f2, f3 are referred as frequency (in Hertz). Further, p63 and p64 refer to power. The expression 'rpm' refers to rotation per minute. The expression 'vel' refers to velocity and uts refers to ultimate tensile strength. The above sensor values as depicted in Table 4 are captured from various sensors attached (integral to) to the friction stir wending (FSW machine). Post execution of the input query on the above observation data shown in Table 4, the output is generated in the form of a data frame as depicted in below Table 5.

TABLE 5

| f1 | f2 | f3 | ... | p63 | p64 | rpm | vel | uts |
|---|---|---|---|---|---|---|---|---|
| 5924.17 | 5819.59 | 5846.90 | ... | 2.42 | 2.40 | 599.70 | 38.47 | 210.19 |
| 7840.39 | 7940.39 | 7853.85 | ... | 2.44 | 2.43 | 999.73 | 164.84 | 244.82 |
| 3817.70 | 3898.52 | 3862.67 | ... | 2.49 | 2.49 | 1489.54 | 37.75 | 191.03 |

Example of another output based on the query executed on the observational data comprised in Table 1 is illustrated herein. Given query: select all rows for a given condition. This filter function can be executed faster and efficiently in distributed environment if it is available based on the above metadata. In case ordering of dataset needs to be preserved, it is recommended to use non-distributed approach, in one example embodiment.

One typical example of query: Filter sensor records and select specific columns:
  select_df=etl.rearrange(
  etl.filter(df,
    "sensor=='F_S1' or sensor=='F_S2'"),
    ["sensor", "time(ms)", "s_torque", "z_load"])
  etl.show(select_df)

The output generated based on the query executed on the observational data (depicted in Table 4) is depicted in Table 6 as shown in below:

TABLE 6

| sensor | time(ms) | s_torque | z_load |
|---|---|---|---|
| F_S1 | 0.0 | −0.712 | −318.4955 |
| F_S1 | 0.0 | 2.067 | −325.9819 |
| F_S1 | 0.0 | 5.252 | −884.7176 |
| F S1 | 100.0 | 9.712 | −273.6464 |
| F_S2 | 100.0 | 2.048 | −325.6719 |
| F_S2 | 200.0 | 8.723 | −295.4693 |
| ... | ... | ... | ... |
| F_S1 | 2200.0 | 9.741 | −283.9364 |
| F_S2 | 2300.0 | 4.381 | −305.5427 |
| F_S1 | 2300.0 | 14.549 | −296.1792 |
| F_S2 | 2400.0 | 14.292 | −286.9637 |

In the above table, F_S1 and F_S2 refer to sensor type associated with the FSW machine. time (ms) refers to time taken for an instance of a job, s_torque refers to a torque value and z_load refers to an impedance value obtained from the FSW machine. Yet another example of an input query includes, join and aggregate. Depending on the data size and metadata, number of joins, queries are executed in a distributed or a non-distributed processing environment dynamically during runtime. For any user defined customized functions written for certain environment, can run in all environments seamlessly.

Referring to steps of FIG. 2, at step 214 of the present disclosure, the one or more hardware processors 104 pre-process the obtained data frame in one of the first or second processing environment and the pre-processed data frame in the second processing environment. In other words, the output of step 212 (e.g., the obtained data frame) is prepocessed in either the distributed computing environment or the non-distributed computing environment and the pre-processed data frame is plotted/visualized in the non-distributed computing environment.

Figure 3:
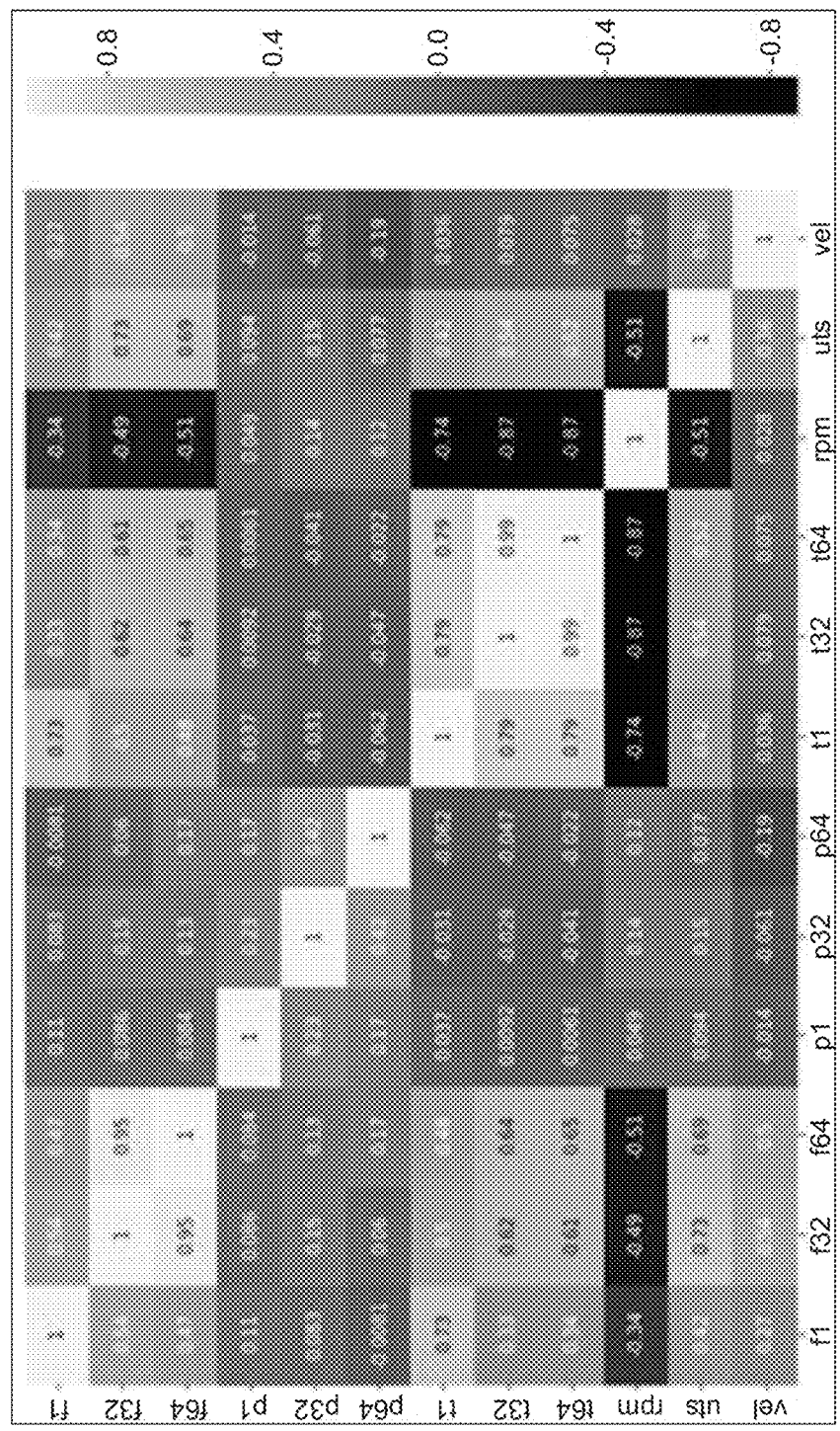
FIG. 3 depicts a correlation plot of various sensor values comprised in observational data, in accordance with an embodiment of the present disclosure.
Figure 4:
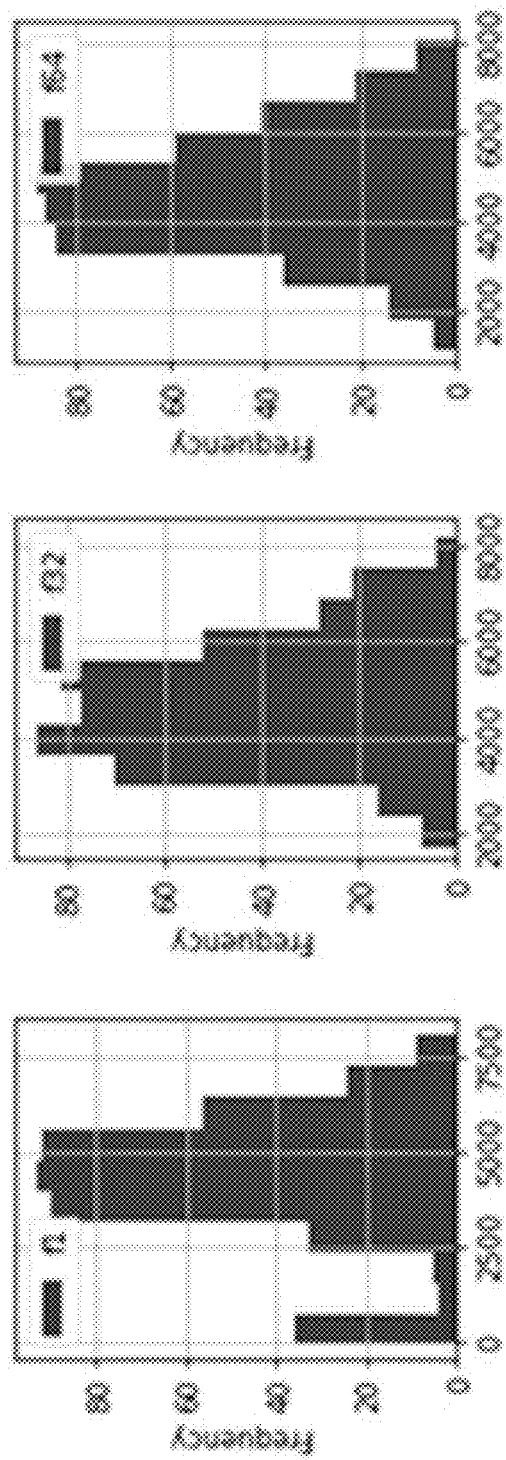
FIG. 4 depicts a multiple histogram plot of dataset (on Table 4), in accordance with an embodiment of the present disclosure.

Visualization/Plotting is possible only in a non-distributed computing environment. Given a distributed data frame as an output of step 212, for obtaining histogram plot or correlation plot, the binning or the correlation matrices are generated in the distributed environment, and internally converted to a non-distributed data frame only for the plotting. One or more technique(s) such as Uniform Manifold Approximation and Projection (UMAP), t-distributed stochastic neighbor embedding (t-sne) and the like, which do not work in a distributed computing environment, lead to conversion of data frames from a distributed to non-distributed and then such techniques are applied on the pre-processed data frame to visualize or plot in the non-distributed environment. In other words, the obtained data frame is of a high dimensional data frame which is pre-processed to realize the data in a 2 dimension. So, the high dimensional data comprised in the obtained data frames is reduced to 2D for plotting/visualization. One typical example of plot: etl.plot (df, ["f1", "f32", "f64", "p1", "p32", "p64", "t1", "t32", "t64", "rpm", "uts", "vel"], isCorr=True). FIG. 3, with reference to FIGS. 1 through 2, depicts a correlation plot of various sensor values comprised in observational data, in accordance with an embodiment of the present disclosure. In FIG. 3, the correlation plot illustrates relationship between the variables (sensor values of the observational data) within a scale of −1 to +1. FIG. 4, with reference to FIGS. 1 through 3, depicts a multiple histogram plot of dataset on Table 4, in accordance with an embodiment of the present disclosure. More specifically, in the histogram plot, a group of data points in specified data range (or bin) is represented. The correlation and histogram plots as depicted in FIGS. 3 and 4 are based on a selection of some columns of Table 4, in one example embodiment.

Moreover, user(s) can apply any machine learning (ML) method to create ML model based on the pre-processed data frame serving as an output. In case, multiple users need to work on the same data, the system 100 facilitates using a secret API key-based authentication and Identity and Access Management for authorization for multiple tenants (x-api-key), multiple users (x-user-key) over multiple services (services deactivated/activated for each tenant, user) to provide multi-tenancy. On the aspects of the scalability, user can scale with secure containerized environment. The distributed data computation layer and Big data distributed file system can be scaled and accessed by the multiple users without any change and downtime. Once the model is created, it can be communicated to edge using the platform as described herein.

Embodiments of the present disclosure implement system and method for analysing and executing sensor observational data in computing environments, wherein extract, transform, load (ETL) workflow pipeline created by users in the cloud, can be seamlessly deployed to job execution service available in cloud/edge without any changes in the code/config by end user. The configuration changes are internally handled by the system 100 based on the selected computing environment. Below description illustrates how the implementation/deployment of the system and method is carried out.

1. Scripts/Models get packaged in a specific format (e.g., docker image, hash encoded zipped files) using pytcup ETL APIs and transferred via over the air (OTA) to edge/pytcup ETL APIs to job execution service in cloud. Here script/models refer to is the pyETL pipeline generated using above point. Packing of the model is done such that the system and method of the present disclosure work with both batch data in cloud (e.g., cloud computing systems) and streaming data in edge device(s) (e.g., mobile communication device(s) and the like).
2. Based on the environment/configuration, scripts/models are executed on job execution platform in cloud or as a container in edge.
   a. For execution scripts/models on job execution platform, no modification is required.
   b. For execution of scripts/models in edge, assuming that no distributed environment is present, so internally the system switches from a distributed computing environment to a non-distributed computing environment. No code or configuration change from end user is required.
3. Resulting artifacts are stored in the required file format in required storage systems
   a. Resulting artifacts can be transformed to data files, visualization charts/plots and the like.
   b. File formats can be parquet, comma separated values (csv), png, pkl, etc.
   c. Storage system can be AWS-S3, Azure-BLOB, NFS, HDFS, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving, via one or more hardware processors, an input comprising one or more parameters specific to an industrial internet of things (IIoT) use case;
selecting, via the one or more hardware processors, a first processing environment based on the one or more parameters;
generating, via the one or more hardware processors, metadata based on the first processing environment, wherein the metadata is generated based a location information corresponding to an observational data comprised in a database, and wherein the observational data is specific to one or more sensors deployed in an IoT network;
populating, via the one or more hardware processors, the observational data in the first processing environment based on (i) a storage system, (ii) the metadata and (iii) number of available resources in the first processing environment;
receiving, via the one or more hardware processors, one or more input queries from one or more users;
executing, via the one or more hardware processors, the one or more input queries on the observational data, in the first processing environment or a second processing environment to obtain a data frame; and
pre-processing, via the one or more hardware processors, the obtained data frame in one of the first processing environment or the second processing environment and plotting the pre-processed data frame in the second processing environment.

2. The processor implemented method of claim 1, wherein the one or more parameters comprise at least one of one or more available resources, the observational data, an input data query, an enterprise storage system type, and a file format.

3. The processor implemented method of claim 1, wherein the first processing environment is a distributed computing environment, and wherein the second processing environment is a non-distributed computing environment.

4. The processor implemented method of claim 1, wherein the metadata comprises at least one of a file format, a file size, number of observations in the observational data, datatype of one or more observed properties in the observational data, and frequency of the observational data.

5. The processor implemented method of claim 1, wherein the step of executing, the one or more input queries on the observational data, in one of the first processing environment or the second processing environment to obtain a data frame comprises determining whether the one or more input queries are executable in the first processing environment or the second processing environment and switching from the first processing environment to the second processing environment for execution of the one or more input queries respectively.

6. A system, comprising:
a memory storing instructions;
one or more communication interfaces; and
one or more hardware processors coupled to the memory via the one or more communication interfaces, wherein the one or more hardware processors are configured by the instructions to:
receive an input comprising one or more parameters specific to an industrial internet of things (IIoT) use case;
select a first processing environment based on the one or more parameters;
generate metadata based on the first processing environment, wherein the metadata is generated based a location information corresponding to an observational data comprised in a database, and wherein the observational data is specific to one or more sensors deployed in an IoT network;
populate the observational data in the first processing environment based on (i) a storage system, (ii) the metadata and (iii) number of available resources in the first processing environment;
receive one or more input queries from one or more users;
execute the one or more input queries on the observational data, in the first processing environment or a second processing environment to obtain a data frame; and
pre-process the obtained data frame in one of the first processing environment or the second processing environment and plot the pre-processed data frame in the second processing environment.

7. The system of claim 6, wherein the one or more parameters comprise at least one of one or more available resources, the observational data, an input data query, an enterprise storage system type, and a file format.

8. The system of claim 6, wherein the first processing environment is a distributed computing environment, and wherein the second processing environment is a non-distributed computing environment.

9. The system of claim 6, wherein the metadata comprises at least one of a file format, a file size, number of observations in the observational data, datatype of one or more observed properties in the observational data, and frequency of the observational data.

10. The system of claim 6, wherein the step of executing, the one or more input queries on the observational data, in one of the first processing environment or the second processing environment to obtain a data frame comprises determining whether the one or more input queries are executable in the first processing environment or the second environment and switching from the first processing environment to the second processing environment for execution of the one or more input queries respectively.

11. A computer program product comprising a non-transitory computer readable medium having a computer readable program embodied therein, wherein the computer readable program, when executed on a computing device causes the computing device to analyse and execute sensor observational data in computing environments by:

receiving, via one or more hardware processors, an input comprising one or more parameters specific to an industrial internet of things (IIoT) use case;

selecting, via the one or more hardware processors, a first processing environment based on the one or more parameters;

generating, via the one or more hardware processors, metadata based on the first processing environment, wherein the metadata is generated based a location information corresponding to an observational data comprised in a database, and wherein the observational data is specific to one or more sensors deployed in an IoT network;

populating, via the one or more hardware processors, the observational data in the first processing environment based on (i) a storage system, (ii) the metadata and (iii) number of available resources in the first processing environment;

receiving, via the one or more hardware processors, one or more input queries from one or more users;

executing, via the one or more hardware processors, the one or more input queries on the observational data, in one of the first processing environment or a second processing environment to obtain a data frame; and pre-processing, via the one or more hardware processors, the obtained data frame in one of the first processing environment or the second processing environment and plotting the pre-processed data frame in the second processing environment.

12. The computer program product comprising a non-transitory computer readable medium of claim 11, wherein the one or more parameters comprise at least one of one or more available resources, the observational data, an input data query, an enterprise storage system type, and a file format.

13. The computer program product comprising a non-transitory computer readable medium of claim 11, wherein the first processing environment is a distributed computing environment, and wherein the second processing environment is a non-distributed computing environment.

14. The computer program product comprising a non-transitory computer readable medium of claim 11, wherein the metadata comprises at least one of a file format, a file size, number of observations in the observational data, datatype of one or more observed properties in the observational data, and frequency of the observational data.

15. The computer program product comprising a non-transitory computer readable medium of claim 11, wherein the step of executing, the one or more input queries on the observational data, in one of the first processing environment or the second processing environment to obtain a data frame comprises determining whether the one or more input queries are executable in the first processing environment or the second processing environment and switching from the first processing environment to the second processing environment for execution of the one or more input queries respectively.

* * * * *